Sept. 15, 1964   A. ROTH   3,149,196
VEHICULAR GUIDANCE SYSTEMS
Filed March 2, 1960
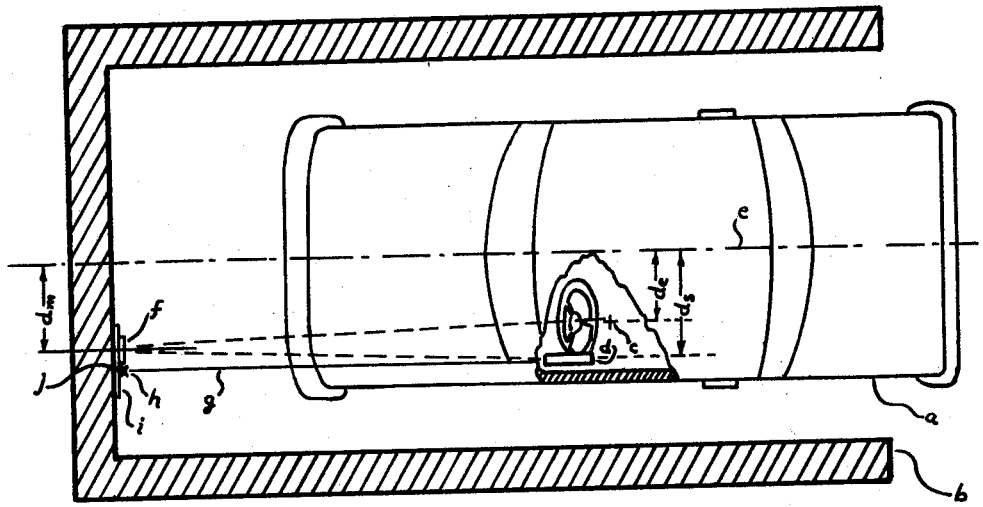
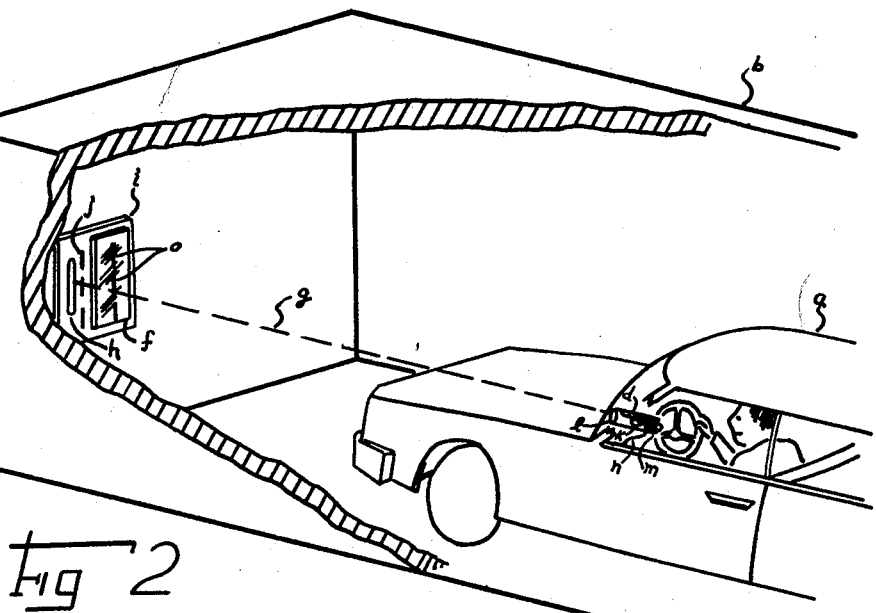
INVENTOR.

United States Patent Office 3,149,196
Patented Sept. 15, 1964

3,149,196
VEHICULAR GUIDANCE SYSTEMS
Alexander Roth, 166 S. 2nd Ave.,
Fort Walton Beach, Fla.
Filed Mar. 2, 1960, Ser. No. 12,334
1 Claim. (Cl. 88—2.2)

The object of this invention is to provide an optical guidance means, by which guidance information can be given to the operator of a vehicle for purposes of accurately guiding the vehicle down a prescribed path. In the particular application described in this patent the device is shown to enable the driver of an automobile to drive into and out of a garage, or some shelter, or any confined passageway while controlling the car with precision, along the optimum path. In the broad sense however, this invention is not limited to automobiles, but may apply to any type of vehicle, on the ground, sea, or in the air.

In order to illustrate the invention reference is made to the following figures.

FIG. 1. This shows the plan view of an automobile partially inside of a garage and the major components of my invention.

FIG. 2. This shows a possible arrangement of the two major components of my invention, and the position of the driver.

There are two major modes of operation of this device: (1) Going forward while using the device, and (2) Reversing by using the device.

First the mode of forward motion will be considered. In FIGURE 1, $a$ shows the position of a cart partially entered into garage $b$. The cross at $c$ represents the position of the driver's head, or more exactly the mean position of his eyes. A light source is placed at some convenient point where it might shine through the windshield, for example at $d$. $e$ represents the position of the center-line, or a central vertical plane of the garage, shown for purposes of illustration to be also coincident with the central vertical plane passing through the automobile. Let $d_e$ be the distance from the plane $e$ to the driver's eyes, and let $d_s$ be the distance from the plane $e$ to the source of light. We now define the distance from the central plane $e$ to a point midway between the driver's head and the source of light, and that distance is equal to $\frac{1}{2}(d_e+d_s)$. $f$ represents a mirror placed in the line of motion of the automobile such that the center of the mirror is at a distance from the central plane $e$ given by $d_m$ where $d_m=\frac{1}{2}(d_e+d_s)$.

The driver is instructed to position himself at the same point relative to the vehicle every time, for example directly behind the steering wheel. It is obvious that the driver, observing the reflection of the source of light in the mirror $f$, will observe the source (along the broken line), as being directly in the center of the mirror. If the car is now considered to be in motion, any deviation of the automobile from the correct position at the center of the garage will cause a displacement of the image which is observed by the driver at $c$. If the image which is observed in the mirror appears to the left of center then the driver knows that he has to make a right turn, and if the image appears in the mirror to the right then vice-versa.

The reverse motion of the automobile will now be considered. The source of light $d$ also emits a beam of rays $g$, parallel to the car, which form an image represented by the cross at $h$ on a card or screen $i$ provided for the purpose of rendering the image visible. So long as the automobile is aimed in the correct direction during the reverse mode, the image $h$ will appear at the prescribed point $j$ of the card $i$. If the image moves to the left of the prescribed point, the driver is instructed to turn his wheel to the left (to center the image) producing a clockwise motion of the automobile. If the image shows up to the right of the prescribed point then the driver turns his wheel to the right. It will be noted that the reverse motion mode according to the above described method does not guarantee that the automobile moves along the center line $e$ but does however limit the travel along a radial line approximately emanating from the point $j$. In spite of this restriction however, that the automobile is limited to a radial motion for reverse, it will nevertheless closely follow the center line of the garage.

FIGURE 2 shows a little more detail of the components of the invention and a possible relative placement between them and the operator of the automobile. The light source is shown in phantom form, supported in some manner at $d$ with a lamp at $k$ and a lens at $l$ and a switch at $m$ with a wire $n$ going to the voltage supply. The light source produces the beam $g$ and an image $h$ which can be considered a projection of the filament in this case. Any other beam forming system may be utilized, such as an aperture, a reflector etc. $j$ shows the mark on the card $i$ with which the image $h$ must be made to line up. The image $h$ in FIGURE 2 is shown slightly to the left of the reference mark $j$, and if the driver were operating his car in reverse, he would turn his steering wheel counterclockwise. The distance of the marker $j$ from the central plane $e$ is equal to $d_s$. At $f$ is shown the mirror and $o$ represents a guide mark to clarify the center of the mirror.

What I claim is:

An optical guidance system for guiding a motor vehicle, forward and backward, into and out of a confined space comprising a plane reflector and a mat screen located at the far end of said confined space, a beam forming light source located on the vehicle, said reflector being vertical and positioned to be normal to a vertical reference plane which defines the desired pathway so that the distance from a first reference mark on said reflector to said reference plane is equal to one half the distance from the light source to said vertical reference plane, plus one half the distance from a point at the center of the expected position of a driver's head to said reference plane when said vehicle is properly aligned, said light source being located on the vehicle so as to be visible as a reflection in said reflector from said expected position, whereby, the position of said reflection is in alignment with the position of said reference mark on the reflector as viewed from said expected position only when the vehicle is aligned with the desired pathway, when guiding said vehicle in a forward direction, a second reference mark on said mat screen at a distance from the said reference plane equal to the distance of the light source from said reference plane, whereby collimated light emitted from said source and striking said screen provides an indication of the angular displacement of the vehicle when guiding the vehicle in a reverse direction.

References Cited in the file of this patent

UNITED STATES PATENTS

| | | |
|---|---|---|
| 1,969,852 | Markosek | Aug. 14, 1934 |
| 2,416,071 | Shonnard | Feb. 18, 1947 |
| 2,784,925 | Goodhart | Mar. 12, 1957 |
| 3,072,010 | Brill | Jan. 8, 1963 |

OTHER REFERENCES

Popular Science Monthly, Auto Ideas, vol. 126, January 1935, page 76.